(12) United States Patent
Parker et al.

(10) Patent No.: US 7,530,222 B2
(45) Date of Patent: May 12, 2009

(54) HYDRAULIC APPARATUS, SYSTEM AND METHOD FOR POSITIONING AN ENGINE EXHAUST FLOW CONTROL VALVE

(75) Inventors: David G. Parker, Shelby, NC (US); Alfred J. Babineau, Shelby, NC (US); Michael J. Burkett, Shelby, NC (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/360,102

(22) Filed: Feb. 23, 2006

(65) Prior Publication Data

US 2007/0193259 A1  Aug. 23, 2007

(51) Int. Cl.
*F01N 7/10* (2006.01)

(52) U.S. Cl. .............. 60/324; 60/274; 60/278; 60/288; 60/292; 60/293; 123/323; 123/568.18; 123/568.23; 123/568.24; 123/568.26

(58) Field of Classification Search ............ 60/274, 60/278, 287, 288, 291, 292, 293, 312, 324; 123/323, 568.11, 568.18, 568.21, 568.23, 123/568.24, 568.26
See application file for complete search history.

(56) References Cited

U.S. PATENT DOCUMENTS

| | | | | |
|---|---|---|---|---|
| 2,717,583 | A | * | 9/1955 | Maybach et al. ............ 123/363 |
| 3,805,521 | A | * | 4/1974 | Dafler et al. ................ 60/288 |
| 4,051,821 | A | * | 10/1977 | Amann ....................... 123/393 |
| 5,113,652 | A | * | 5/1992 | Baines et al. ................. 60/288 |
| 5,246,205 | A | * | 9/1993 | Gillingham et al. ......... 251/334 |
| 6,073,652 | A | | 6/2000 | Wilke et al. ............ 137/596.16 |
| 6,109,027 | A | * | 8/2000 | Schaefer ...................... 60/324 |
| 6,273,059 | B1 | * | 8/2001 | Wagner ...................... 123/323 |
| 6,286,307 | B1 | * | 9/2001 | Feeny et al. .................. 60/324 |
| 6,810,850 | B2 | * | 11/2004 | Anderson et al. ........... 123/323 |
| 6,883,320 | B2 | | 4/2005 | Tyler .......................... 60/602 |

FOREIGN PATENT DOCUMENTS

| | | |
|---|---|---|
| DE | 9215962 U1 | 4/1993 |
| EP | 1593893 A1 | 11/2005 |
| EP | 1624168 A2 | 2/2006 |
| JP | 10220630 A | 8/1998 |

* cited by examiner

*Primary Examiner*—Binh Q. Tran
(74) *Attorney, Agent, or Firm*—Ortiz & Lopez

(57) ABSTRACT

A hydraulic assembly and method for use with an vehicle engine exhaust flow control valve for controlling flow to at least one intake supply. The assembly has an actuator, such as a spring return piston cylinder, for positioning the control valve. An inlet passage, communicating with the cylinder, is arranged for supplying hydraulic fluid to a side of the actuator and a drain is arranged for draining the hydraulic fluid from the side of the actuator. An on-off type hydraulic valve, communicating with the drain, is operably coupled to the cylinder for controlling communication of the hydraulic fluid from the cylinder side to the drain. When the hydraulic assembly is in use, the pressure of hydraulic fluid acting on the actuator is adjustable by operation of the on-off type valve thereby to control movement of the actuator and, in turn, movement of the control valve.

15 Claims, 4 Drawing Sheets

HYDRAULIC APPARATUS, SYSTEM AND METHOD FOR POSITIONING AN ENGINE EXHAUST FLOW CONTROL VALVE

TECHNICAL FIELD

Embodiments are generally related to hydraulic apparatus for adjusting the position of flow control valves and, more particularly, to hydraulic apparatus adapted for use with an engine exhaust flow control valves. Embodiments are additionally related to methods of adjusting the position of flow control valves, in particular, engine exhaust control valves. Additionally, embodiments are related to hydraulic assemblies for positioning control valves, such as butterfly valves, for diverting engine exhaust flow to different intake supplies, and to control systems incorporating such hydraulic assemblies.

BACKGROUND

In an engine control system, a turbocharger can be employed on an internal combustion engine in order to significantly boost the engines horsepower without significantly increasing its weight. Some diesel engines are equipped with two turbochargers, one which operates continuously, and one which is used when there is a demand for high power from the engine. The turbocharger works by engine exhaust flow acting on a turbine, causing it spin. The turbine in charge is connected to a compressor which compresses engine intake air ("boost") and increases the power of the engine. A butterfly valve, disposed in the engine exhaust passageway, controls exhaust flow to the turbochargers. The valve is closed when the second turbocharger is not needed, thus preventing exhaust flow from entering the second turbocharger. As demand increases, the butterfly valve is opened, allowing exhaust flow to spin the turbine of the second turbocharger, hence providing additional boost.

The butterfly valve may be operated by a servomechanism which includes a three way hydraulic solenoid valve having a spool to control pressure on two sides of a piston. Applying power to the solenoid generates a force on the armature of the solenoid, which in turn moves the spool. As the spool moves, it opens one port and closes another, to apply pressure to one side of the actuator piston, and drain oil from the opposite side of the actuator piston. A force representing the position of the control valve is fed back to the spool by means of a cam and spring to oppose the force applied by the solenoid. When the feedback force and force applied by the solenoid are balanced, the spool valve is brought to the "null" state in which the spool is centered between the ports, and no oil flows, except for leakage flow. As a result, the butterfly valve stops rotating and is held in a desired operating position.

The aforementioned servomechanism has several drawbacks including the high cost of manufacturing the servomechanism.

The embodiments disclosed herein therefore directly address the shortcomings of present servomechanisms by providing a low cost and power efficient hydraulic assembly for controlling an engine exhaust flow control valve.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is, therefore, one aspect to provide for an improved hydraulic assembly for use with flow control valves.

It is another aspect of the present invention to provide for such a hydraulic assembly which is can be manufactured at low cost.

The aforementioned aspects of the invention and other objectives and advantages can now be achieved as described herein.

According to one aspect, a hydraulic assembly adapted for use with an engine exhaust flow control valve has a hydraulic actuator for positioning the control valve and a hydraulic circuit, which is connected to the hydraulic actuator, for supplying hydraulic fluid to one side of the actuator. An on-off type hydraulic valve is arranged in the hydraulic circuit and operably coupled to the actuator for controlling communication of the hydraulic fluid away from the side of the actuator. When the hydraulic assembly is in use the pressure of hydraulic fluid acting on the side of the actuator is adjustable by operation of the on-off type valve thereby to control movement of the actuator and, in turn, movement of the control valve. The control valve can be for example a butterfly valve.

Unlike a proportional spool valve system, which requires the use of flow passages to direct oil to the both sides of the actuator piston, the hydraulic assembly 11 requires flow passages only to one side of the actuator. Consequently, the amount of required drilling through the outside of the body in order to form the passages is minimized as is the amount of required sealing of the openings in the exterior of the body thereby reducing manufacturing cost and also potential for leaks.

The actuator can be a spring return piston disposed in a cylinder. By employing a spring return piston, controlled by a simple on/off of type valve, a low cost hydraulic assembly for adjusting the control valve can be provided. The on-off type hydraulic valve can be operable in an open loop control mode to control the piston so that feedback of the position of the piston to control the valve is not necessary. Such an open loop system further reduces manufacturing costs.

The on-off type hydraulic valve can include a port or hole communicating with the side of the cylinder. The hydraulic valve can be operable to substantially close the port to thereby increase the pressure in the cylinder and to substantially open the port to drain hydraulic fluid from the cylinder to thereby decrease the cylinder pressure. The port can be substantially opened and substantially closed by powering the on-off type hydraulic valve off and on, respectively. Advantageously, power need not be supplied continuously to the valve to keep the piston retracted and the butterfly valve closed thereby providing a power efficient hydraulic assembly.

The on-off type hydraulic valve can be an electrohydraulic valve, for example a poppet valve operated by a solenoid. Advangeously, the poppet valve is not susceptible to sticking due to presence of contamination in the oil unlike in a spool valve which is liable to contamination becoming trapped in the small gap, resulting in the spool getting stuck and loss of control. If this should happen, for example, when the butterfly valve is open and the second turbocharger is operational, it is impossible to control the second turbocharger, resulting in excess power. Alternatively, if this should occur when the butterfly valve is closed, then the vehicle would lack adequate power. Furthermore, the length of the poppet valve is shorter than a spool valve allowing for smaller packaging of the hydraulic assembly.

According to another aspect, a hydraulic system for selectively diverting engine exhaust flow to different intake supplies has a spring return piston disposed in a cylinder for positioning a control valve for use in an exhaust gas line to direct exhaust flow to a selected intake supply. An inlet passage, communicating with the cylinder, is arranged for supplying hydraulic fluid to a side of the cylinder. A drain is provided for draining the hydraulic fluid from the cylinder side. An on-off type hydraulic valve, communicating with the drain, can be operably coupled to the cylinder for controlling communication of the hydraulic fluid from the cylinder side to the drain. When the hydraulic assembly is in use the pressure of hydraulic fluid acting on the piston is adjustable by operation of the on-off type valve thereby to control movement of the piston and, in turn, movement of the control valve.

The system can include a rack and pinion operably coupled to the piston for transferring linear movement of the piston into rotary movement of the control valve. The rack can be integrally formed in the piston.

The on-off type valve, which can be a poppet type valve, can be operated by a solenoid.

The solenoid poppet valve can include a port or hole communicating with the cylinder and the poppet valve can be operable to substantially close the port to thereby increase the pressure in the cylinder and to substantially open the port to communicate hydraulic fluid from the cylinder to the drain and thereby decrease the cylinder pressure. The port can be substantially opened by powering the solenoid off and the port can be substantially closed by powering on the solenoid.

The hydraulic system can have a controller, operably coupled to the solenoid, for controlling activation of the on-off type valve and an engine sensor, operably coupled to the controller, for sensing a property of the engine. The controller can be arranged to power the solenoid in response to a signal received from the engine sensor to thereby adjust the piston actuator according to the signal. The controller can be adapted to vary the duty cycle of the solenoid to thereby control the position of the piston actuator.

According to yet another aspect, a method of adjusting a control valve for controlling exhaust flow in an engine comprises providing a hydraulic actuator comprising a spring return piston disposed in a cylinder, supplying hydraulic fluid to the cylinder, operably coupling an on-off type hydraulic valve to the cylinder, the on-off hydraulic valve communicating with a drain, powering the on-off type hydraulic valve on and off to control communication of hydraulic flow from the cylinder to the drain to thereby adjust the pressure of hydraulic fluid acting on said piston, transferring motion of the piston, caused by a change in the hydraulic pressure, to the flow control valve, and adjusting the position of the flow control valve by controlling the on-off type hydraulic valve.

The on-off type hydraulic valve can be a solenoid operated valve, such as a poppet type valve. The method of powering the on-ff type solenoid valve can comprise cycling the solenoid valve between an energized and a de-energized state. The method of powering the solenoid valve can further comprise providing a pulse width modulated (PWM) signal to the solenoid valve and modifying the pulse width of said signal (duty cycle) to thereby position the piston.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
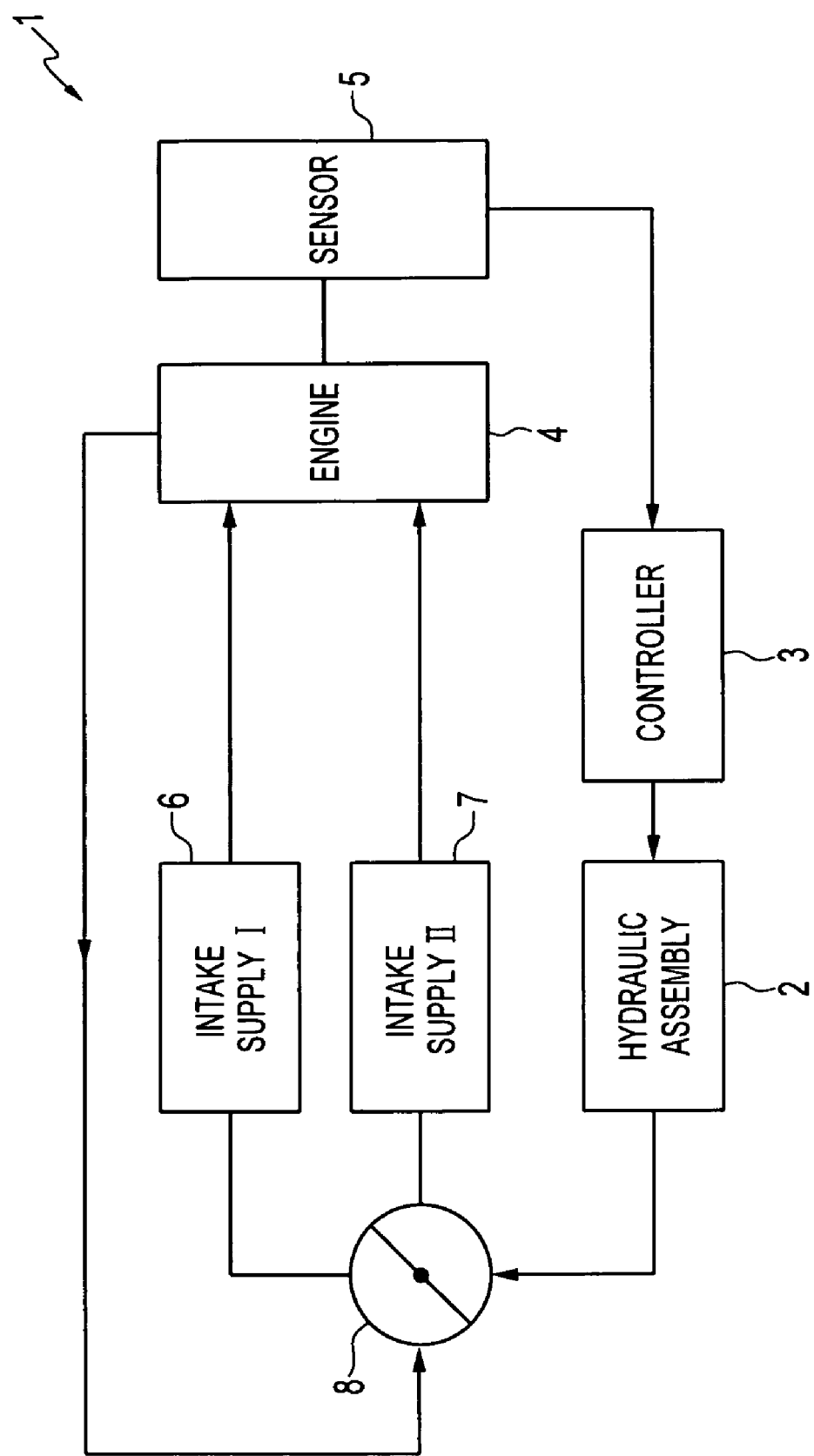
FIG. 1 illustrates a block diagram of an engine exhaust control system incorporating a hydraulic assembly according to one embodiment.

Referring to FIG. 1 of the accompanying drawings, which illustrates a block diagram of an engine exhaust control system incorporating a hydraulic assembly according to one embodiment, a vehicle engine control system 1 includes a hydraulic assembly 2 operably coupled to a flow control valve 8 which is arranged in the exhaust gas line of an internal combustion engine 4 of a vehicle. A controller 3, such as an electronic engine control module (ECM) of the vehicle, is adapted to provide a power signal to the hydraulic assembly 2 according to one or more engine and/or vehicle operating parameters, such as for example engine RPM, throttle position, and/or engine coolant temperature, detected by one or more sensors 5 coupled to the controller.

Control valve 8 is arranged selectively to direct exhaust gas passing through an exhaust passageway from an upstream location to different intake supplies 6, 7 located downstream. In the illustrative embodiment, intake supplies 6, 7 are turbochargers, however, other types of intake supplies can be employed instead of turbochargers. Also, in this particular embodiment, the first turbocharger 6 is always open and the control valve 8 is a butterfly valve which is arranged to control flow to the second turbocharger 7. However, the control valve 8 can be arranged to control flow to both turbochargers 6, 7 if necessary. When the engine 4 is operating at low speed, the control valve 8 is positioned so that all the exhaust flow is directed to the first turbocharger 6 which generates the boost pressure alone whereas, when the engine 4 is operating at higher speeds, the control valve 8 is positioned so that some or all of the exhaust flow is directed to the second turbocharger 7 which generates the additional boost pressure on demand.

The configuration of the turbochargers 6, 7 in the engine feedback system is apparent to those skilled in the art as is the required position of the control valve to selectively direct exhaust flow to the first and/or second turbochargers to achieve the boost pressure needed to operate the engine. As will be explained in more detail below, control valve 8 is positioned by means of the hydraulic assembly 2 in response to controller 3 receiving an output signal from sensor 5.

Figure 2:
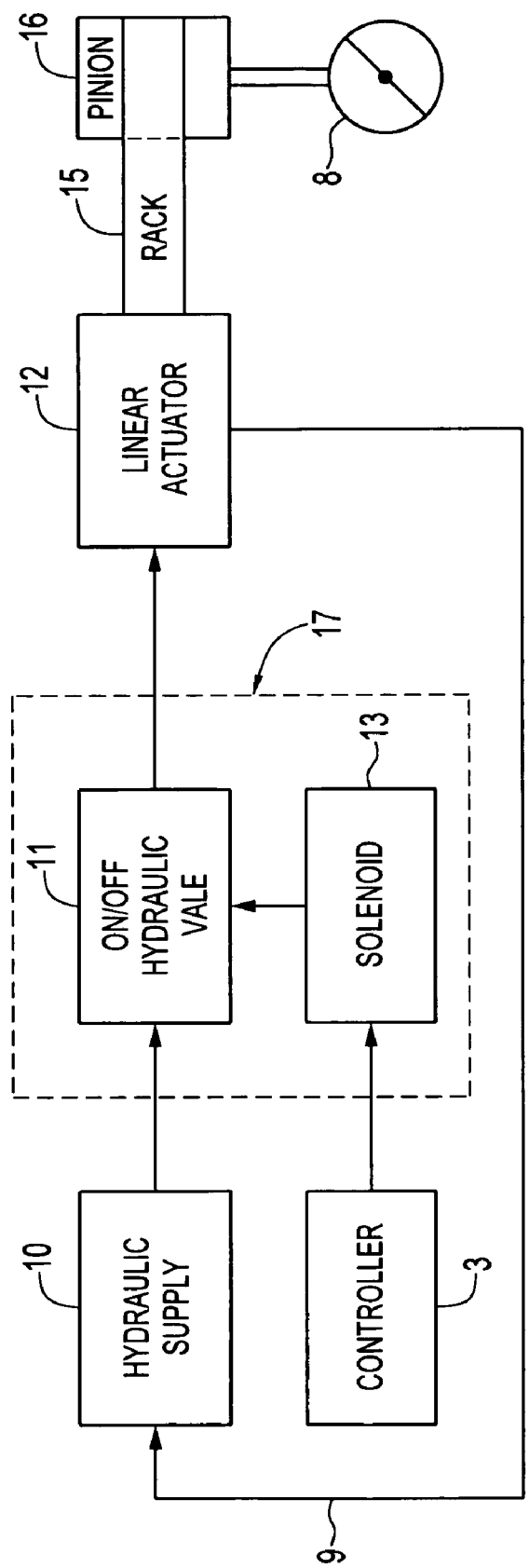
FIG. 2 illustrates a block diagram generally depicting the hydraulic and electrical components of the control system of FIG. 1.

Referring now to FIG. 2, which illustrates a block diagram generally depicting the hydraulic and electrical components of the control system of FIG. 1, the system components include a hydraulic actuator 12 for moving the control valve 8 and an on-off type electrohydraulic valve 17 arranged for adjusting hydraulic fluid flow to the actuator. An on-off type electrohydraulic valve is any type of valve which is operable by electrically powering the valve on and off to open and close the valve port, such as for example a poppet type valve operated by a solenoid, a flapper type valve, a rotary valve or a spool valve. A hydraulic supply 10, such as for example a pumped oil supply of the vehicle engine or power steering system, powers the hydraulic circuit 9. The solenoid 13, in response to power signals form the controller 3, adjusts the on-off type hydraulic valve 11 which determines the hydraulic flow to the actuator 12 and, in turn, movement of the actuator which is transferred into movement of the control valve 8.

In the illustrative embodiment of FIGS. 1 & 2, the control valve 8 is a rotary type valve, such as a butterfly valve, and the hydraulic actuator 12 is a linear motion actuator, coupled to the control valve 8 by means of a rack-and-pinion 15, 16 so that the linear motion of the actuator can be transferred into rotary motion of the control valve 8.

Components of the hydraulic assembly 2 according to one embodiment will now be described in more detail with reference to FIG. 3 which illustrates a cross-sectional side view of a hydraulic assembly for use in the control system of FIG. 1. As a general overview, the hydraulic assembly 2 comprises a spring returned piston 42 arranged in a cylinder 37, and a solenoid operated poppet valve 11, or other type of on/off valve, operably coupled to the cylinder 37 so that the level of hydraulic fluid operating the piston can be regulated by powering the valve on and off. By employing a spring return piston 42, controlled by a simple on/off of type valve, a low cost hydraulic assembly 11 for adjusting the control valve can be provided. Advantageously, electrical power need not be supplied continuously to keep the piston retracted and the butterfly valve closed thereby providing a power efficient hydraulic assembly as will be explained in more detail below.

Preferably, the hydraulic valve is operated in the engine control system in an open loop mode, that is, without the position of the piston being feedback to control the poppet valve thereby further reducing manufacturing costs of the hydraulic assembly.

The poppet valve 11 has an internal chamber 26 which can be opened and closed by means of a slidably mounted pin 19 axially guided to plug and unplug a metered hole 21 formed in the valve seat 20. Pin 19 is formed from a non-magnetic material. A pole piece 24 having a central guide hole 58 serves to guide the pin 19 to the metering hole. The pole piece 24 is threadably engaged to one side of a mating bore 36 of a hexagonal nut 25 and a valve seat 20 is press fitted to the opposite side of the mating bore such that the hexagonal nut 25 together with the seat 20 and pole piece 24 define an internal valve chamber 26 for passing hydraulic fluid.

The pin 19 extends from an armature 31 which is slidably mounted within a tube 32 which has one end 59 clamped to the hexagonal nut 25 by means of the pole piece 24. An o-ring 29 is mounted between the clamping surfaces of the hexagonal nut 25 and tube end 59 to retain hydraulic fluid in the internal chamber 26. The armature 31 is actuated by means of energizing and denergizing the solenoid 13 which is formed from insulated wire wound about the exterior of an electromagnet 33. Electromagnet 33 is in the form of a bobbin surrounding the tube. The solenoid coil 13 and bobbin is typically encapsulated in a polymer protective layer (not shown) which can also be used to form a connector portion (not shown) for connecting the vehicle controller wiring to the valve 11. Terminals formed inside the connector portion can contact electrical contacts in the mating connector of the controller in order to electrically connect the controller wiring to the coil.

The electromagnet 33 and solenoid 13 are supported in a housing 35 which is fitted over the overmolded protective layer and which is rigidly attached to the hexagonal nut 25. The housing 35 is configured to conduct the magnetic flux when current is applied to the coil 13 so as to energize the coil. A return spring 22 is disposed in the internal chamber 26 and acts on a washer 23 which abuts against a shoulder on the pin 19. When the coil 13 is denergized, the armature 31 is free to move axially and the spring 22 retains the pin 19 in a substantially unplugged position in which the metering hole 21 is open allowing hydraulic fluid to pass into the internal chamber 26 whereas, when the coil is energized, the armature moves the pin to a substantially plugged position in which the hole is closed by a tapered end portion 19a of the pin 19 preventing hydraulic fluid from entering the internal chamber 26.

Referring now to cylinder 37, a longitudinal bore 45-47 extends through the cylinder body 60 and is divided into three sections; a first section 45 to which the poppet valve 11 is threadably engaged by means of the hexagonal nut 25, a second section 46 having a cross-sectional area larger than the first section and in which the piston 42 is slidable, and a third section 47 having a cross-sectional area larger than the second section and in which the rack and pinion 15, 16 linkage is substantially disposed. Those skilled in the art would understand that the valve 11 could be integrally formed in the cylinder body if necessary and that fixing means other than a hexagonal nut can be employed to fix the valve 11 to the cylinder body 60. In the illustrative embodiment of FIG. 3, the cylinder body 60 is typically dimensioned to accommodate a piston having a diameter of about 1.5 to 2 inches and a 1 inch stroke.

The poppet valve 11 is engaged to the cylinder body 60 such that at least part of the internal chamber 26 is accommodated within the bore first section 45 leaving a space between the seat 20 and piston 42 to define a control chamber 27. A transverse inlet passage 38 extends through the cylinder body 60 and communicates with the control chamber 27. An orifice 40, formed in the inlet passage 38 for providing a pressure drop in the control chamber 27, is sized to create a sufficient pressure to act on the piston 42, and to allow adequate flow to obtain the desired response time of the piston actuator. A drain or outlet passage 38 also extends through the cylinder body 60 and is aligned with a corresponding transverse passage 41, which is formed in the hexagonal nut 25 and communicates with the mating bore 36, thereby extending the drain passage into the internal chamber 26 of the valve 11. The valve 11 is arranged such that when the metering hole 21 is open, the control chamber 27 can communicate with the drain passage 38 via the internal chamber 26, whereas, when the metering hole 21 is closed, communication from the control chamber to the internal chamber and drain is blocked.

Unlike a proportional spool valve system, which requires the use of flow passages to direct oil to the both sides of the actuator piston, the hydraulic assembly 11 requires flow passages only to one side of the piston. Consequently, the amount of required drilling through the outside of the body in order to form the passages is minimized as is the amount of required sealing of the openings in the exterior of the body thereby reducing manufacturing cost and also potential for leaks.

Communication from the control chamber 27 to the drain 38 can be controlled by powering the solenoid 13 on and off. If necessary, the solenoid 13 can be cycled between an energized and a de-energized state, for example by providing a pulse width modulated (PWM) signal to the solenoid, so as to reciprocate the pin 19 and thereby open and close the metering hole 21 at a selected frequency. As will be explained in more detail below, the pulse width of the signal (duty cycle) can be varied to adjust the flow rate of hydraulic fluid from the control chamber 27 to the drain 38.

A seal 43 is formed in the exterior surface of the piston head 57 to retain fluid pressure in the control chamber 27 by preventing leakage of oil between the control chamber 27 and the bore second section 46. A return spring 44 is arranged in the second section 46 between the piston head 15 and a stop washer 17 which is press fit in the bore third section 47 against a shoulder formed at the intersection of the second and third bore sections 46, 47. A rack portion 15, integrally formed in the piston 42, extends into the third section 47 and is engaged with the gear or pinion 16 which is mounted on a rotatable shaft for attaching to the butterfly valve (not shown). Typically, the rack and pinion is arranged to transfer the linear movement of one piston stroke to 80 degrees of rotational movement of the butterfly valve with 2.5 Newton-meters of torque. A cap 51 including an o-ring 53 for sealing the cylinder 37 is fitted inside the third bore section 47 and retained in position by a retaining ring 54 held in a groove formed in the end of the cylinder body 60. Formed on the underside of the cap 51 is a bore 52 formed which guides the end of the piston 42 as it slides axially.

A hole 56 formed in the cylinder body 60 intercommunicates the bore third section 47 to a longitudinal drain channel 55 which is formed in the cylinder body 60 and which extends along the cylinder body to communicate with the drain passage 38 thereby allowing hydraulic fluid that leaks past the seal 43 to enter the drain 38.

It is noted that a proportional spool valves require a very close tolerance to control the gap between the spool and the valve body that it slides in. The close tolerance control results in high manufacturing costs. Advantageously, such close tolerance requirements are not necessary in for manufacturing the poppet valve 17 so that the cost of manufacturing the hydraulic assembly 11 is yet further reduced. Another advantage of the hydraulic assembly is that the poppet valve 17 is not susceptible to sticking due to presence of contamination in the oil unlike in a spool valve which is liable to contamination becoming trapped in the small gap, resulting in the spool getting stuck and loss of control. If this should happen, for example, when the butterfly valve is open and the second turbocharger is operational, it is impossible to control the second turbocharger, resulting in excess power. Alternatively, if this should occur when the butterfly valve is closed, then the vehicle would lack adequate power. Furthermore, the length of the valve 11 is shorter than a spool valve allowing for smaller packaging of the hydraulic assembly.

Figure 3:
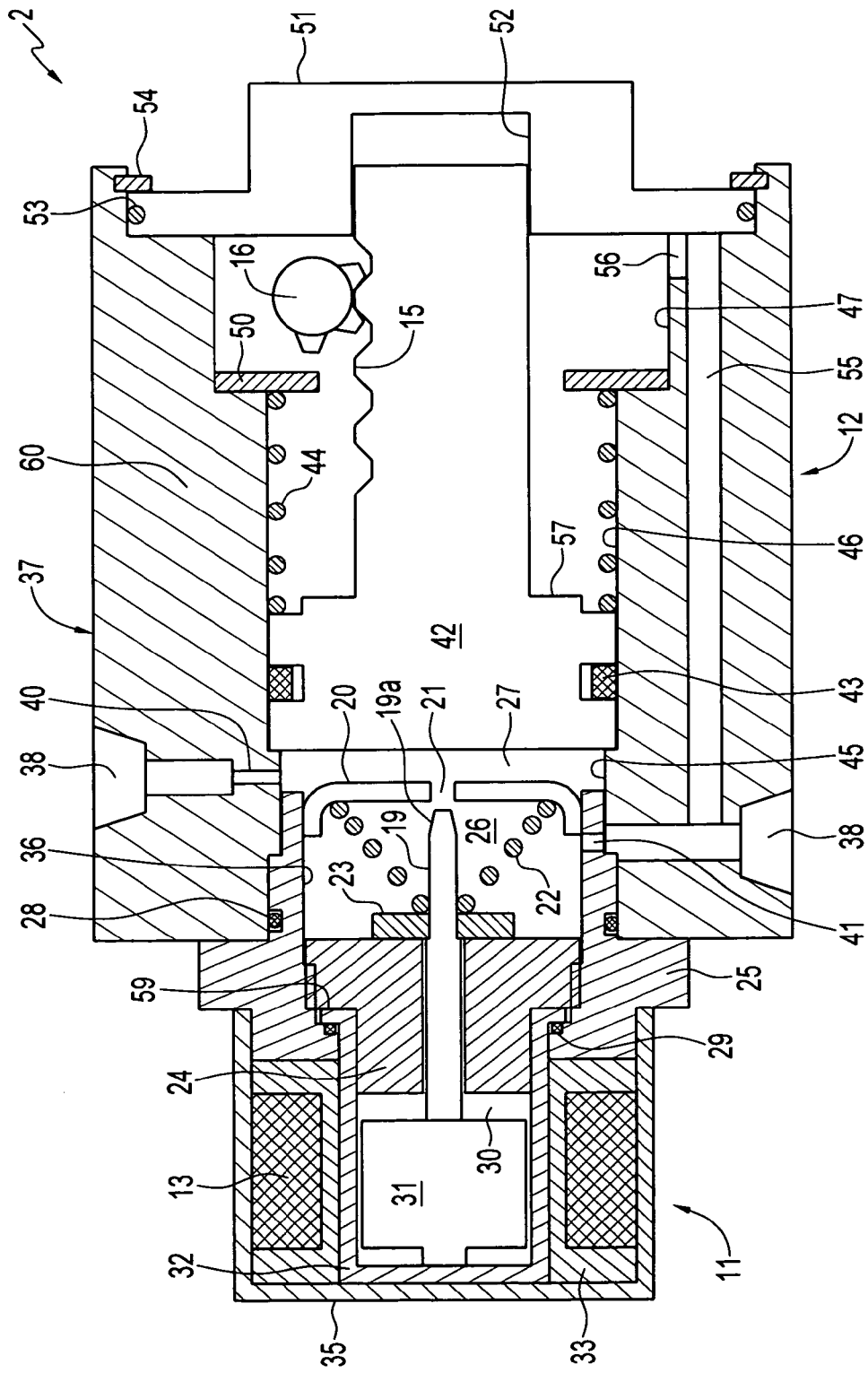
FIG. 3 illustrates a partial cross-sectional side view of a hydraulic assembly according to one embodiment for use in the control system of FIG. 1.
Figure 4:
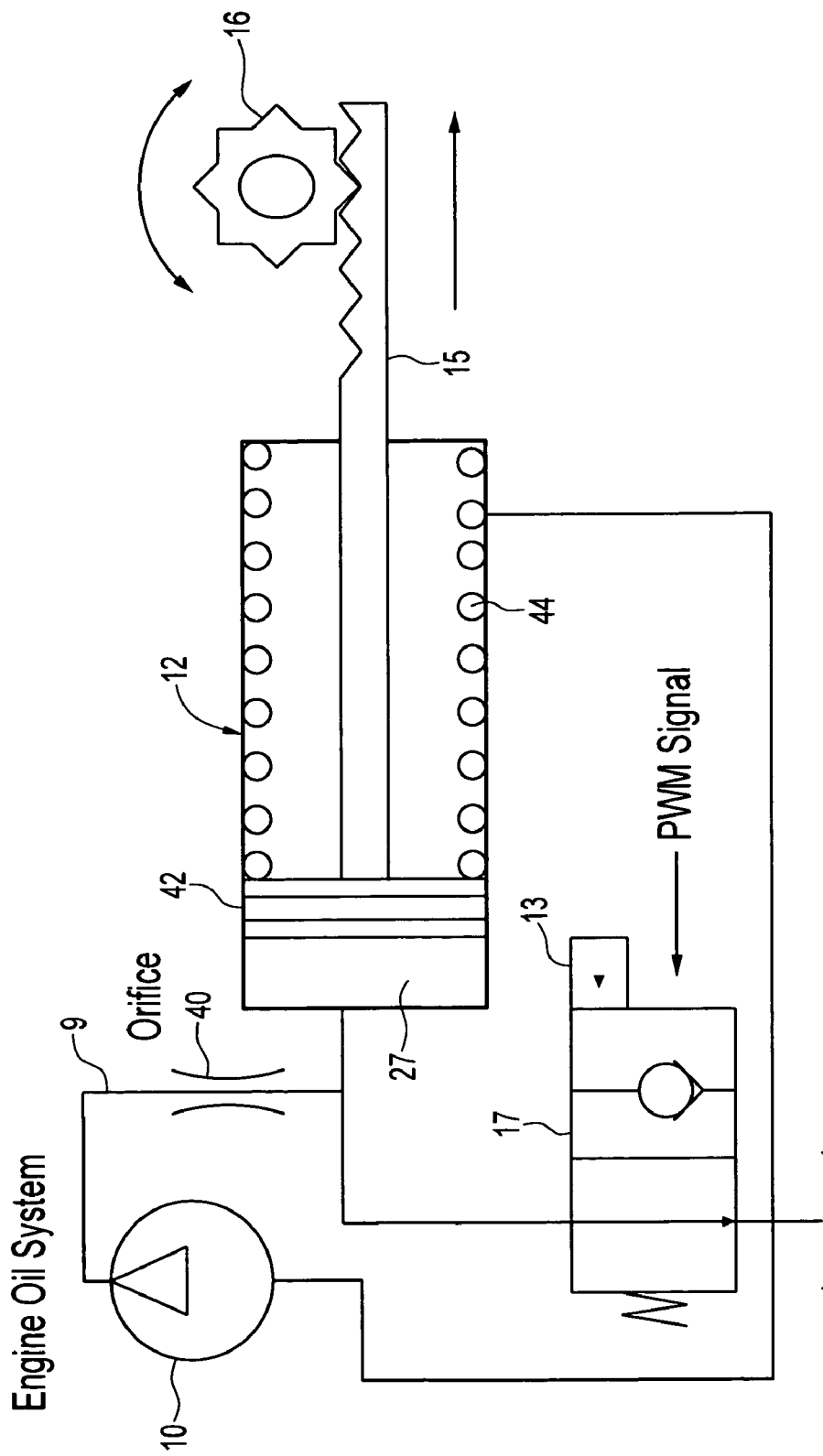
FIG. 4 illustrates a hydraulic circuit diagram of the engine control system incorporating the hydraulic assembly of FIG. 3.

Whist the hydraulic valve of the hydraulic assembly of FIG. 3 is a poppet type valve, alternative on-off hydraulic valves which are operable to open and close a port by powering the valve on and off can be employed to control communication of hydraulic fluid from the control chamber to the drain.

A method of operating the hydraulic assembly of FIG. 3 to adjust the control valve to divert engine exhaust flow according to one embodiment will now be described with reference to FIGS. 1-3 and FIG. 4, which illustrates a hydraulic circuit diagram of the engine control system incorporating the hydraulic assembly of FIG. 3. Initially, the poppet valve 11 is in a de-energized state as shown in FIG. 3, that is, there is no electrical current flowing through the coil windings or the PWM duty cycle is 0%, and the armature 31 is fully retracted so that a gap 30 exists between opposing faces of the armature 31 and pole piece 24. An opening exists between the tapered portion 19a of the pin 19 and the metering hole 21 so that the control chamber 27 continually communicates with the drain 38 via internal chamber 26. The valve 11 is therefore fully open. Advantageously, the coil does not draw current to maintain a "null", or no flow state; the current is zero when the actuator is retracted, when the second turbocharger is not needed. This results in a reduction of the power consumption of hydraulic assembly.

Hydraulic fluid is applied under pressure to the inlet passage 38 and, after passing through the orifice 40, the hydraulic fluid enters the control chamber 27. The hydraulic fluid then flows through the metering hole 21 and out of the hydraulic assembly via the drain to an oil reservoir, such as the vehicle crankshaft case (not shown). Consequently, the control pressure in the control chamber 27 is too low to overcome the force of the piston return spring 44 so that the butterfly valve 8 remains in a closed position and exhaust flow is diverted entirely to the first turbocharger 6.

In response to the engine sensor 10 sensing a demand for additional boost pressure, the controller 3 changes electrical current to the solenoid 13. Increases in average current creates magnetic flux in a path through the coil housing 35, the pole piece 24, across the air gap 30, and then back to the coil housing 35. As the magnetic flux crosses the air gap, it creates a magnetic force which pulls the armature 31 towards the pole piece 24. The armature 31 thus forces the pin 19 to move to plug the metering hole 21 and block communication of hydraulic fluid from the control chamber 26 to the drain 38. This in turn causes pressure to build inside the control chamber 27. As the pressure builds in the chamber 27, it acts against the return spring 44, and forces the piston 42 to move axially towards the gear 16 so that the rack portion 15 rotates the gear 15 causing the butterfly valve 8 to open. This allows exhaust flow to start spinning the turbine of the second turbocharger 7, thus providing additional boost to the engine.

In the illustrative embodiment, the current is applied in the form of a PWM signal and the average current is increased by increasing the duty cycle from 0% to 100%. The pin 19 cycles back and forth at the basic frequency of the PWM current, opening and closing flow through the metering hole 21. At lower duty cycles, for example 30%, the valve 11 is effectively only partially closed because the opening between the tapered portion 19a and the metering hole 21 is on average allowing hydraulic fluid from the control chamber 27 to flow out of the drain 70% of the time. As the duty cycle increases, for example to 70%, the valve 11 is allowing flow out of the drain only 30% of the time. At 100% duty cycle, the valve 11 is fully closed, that is the metering opening 21 is always closed, continually blocking fluid in the control chamber 27 from draining, and the pressure in the control chamber is equal to the supply pressure. Accordingly, by varying the duty cycle of the voltage applied to the electromagnet 33, the valve 11 spends more time open (lower duty cycle, less than 50%), or more time closed (higher duty cycle, greater than 50%).

In response to the engine sensor 5 sensing a reduction or no further demand for additional boost pressure, the controller 3 reduces average electrical current to the solenoid 13. As the duty cycle is decreased, flow of hydraulic fluid from the control chamber 27 out through the drain 38 increases so that the pressure in the control chamber decreases causing the force on the piston 42 to decrease. The return spring 44 forces the piston 42 back, which turns the gear 16 in the opposite direction, thus closing the butterfly valve 8. Consequently, the exhaust flow to the second turbocharger 7 is reduced and finally blocked, reducing the boost supplied to the engine.

It is contemplated that the use of the present invention can involve components having different characteristics. For example, those skilled in the art would understand that the hydraulic assembly of the illustrative embodiments described hereinbefore can be employed to adjust the position of a control valve for controlling flow to components other than engine intake supplies. It is intended that the scope of the present invention be defined by the claims appended hereto, giving full cognizance to equivalents in all respects.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

What is claimed is:

1. A hydraulic assembly adapted for use with an engine exhaust flow control valve, said hydraulic assembly comprising:

a hydraulic actuator for positioning the control valve; said hydraulic actuator having an inlet passage for supplying hydraulic fluid to a side of said hydraulic actuator and a drain for draining said hydraulic fluid from said hydraulic actuator side, a hydraulic circuit, connected to said hydraulic actuator, arranged for supplying hydraulic fluid to said inlet passage;

a poppet type hydraulic valve, operably coupled to said hydraulic actuator, said poppet type hydraulic valve having an internal chamber and a slidably mounted pin to plug and unplug a metered hole formed in a valve seat of said poppet valve, said valve seat being arranged between said inlet passage and said drain such that unplugging and plugging said metered hole opens and closes said internal chamber to control communication of said hydraulic fluid from said inlet passage to said drain via said internal chamber, and wherein said hydraulic actuator comprises a spring return piston disposed in a cylinder, said cylinder comprising a cylinder body and a longitudinal bore extending therethrough having a first section and a second section, wherein said piston is slidable in said second section of said longitudinal bore and wherein said poppet valve is engaged to said cylinder body such that at least part of the internal chamber is accommodated within said first section of said longitudinal bore to leave a space between said valve seat and said piston to define a control chamber communicating with said inlet passage, and wherein said inlet passage extends through a side wall of said cylinder in fluid communication with said control chamber of said cylinder, wherein said drain extends through said cylinder side wall in fluid communication with said internal chamber and wherein said metering hole intercommunicates said internal chamber and said control chamber to control communication of hydraulic fluid from the control chamber to the drain;

whereby, when the hydraulic assembly is in use, the pressure of hydraulic fluid acting on said side of said hydraulic actuator is adjustable by substantially unplugging and plugging said metering hole thereby to control movement of said actuator and, in turn, a movement of said control valve.

2. The assembly of claim 1, wherein said cylinder body includes a third section in which the rack and pinion linkage is substantially disposed.

3. The assembly of claim 2, wherein said poppet type hydraulic valve is operable in an open loop control mode to control said piston.

4. The assembly of claim 1, wherein said poppet type hydraulic valve comprises a solenoid operated poppet valve, wherein the position of said piston is controllable by varying a duty cycle of said solenoid.

5. The assembly of claim 1, wherein said metering port is substantially opened by powering off said poppet type hydraulic valve and wherein said metering port is substantially closed by powering on said poppet type hydraulic valve.

6. The apparatus of claim 1, wherein said poppet type hydraulic valve is operable to substantially close said metering hole to thereby increase said pressure in said cylinder and said poppet type hydraulic valve is operable to substantially open said metering hole to drain hydraulic fluid from said cylinder to thereby decrease said cylinder pressure.

7. A hydraulic system for controlling engine exhaust flow to at least one intake supply, said system comprising:

a spring return piston disposed in a cylinder for positioning a control valve for use in an exhaust gas line to direct exhaust flow to a selected intake supply;

an inlet passage, communicating with said cylinder, arranged for supplying hydraulic fluid to a side of said cylinder;

a drain for draining said hydraulic fluid from said side of said cylinder; and an on-off type hydraulic valve, operably coupled to said cylinder, having a metering port or hole interconnecting said inlet passage and said drain for controlling communication of said hydraulic fluid from said cylinder side to said drain, wherein said on-off type valve is engaged or integrally formed with said cylinder and is operated by a solenoid, wherein said metering hole or port is substantially opened by powering off said solenoid and wherein said metering hole or port is substantially closed by powering on said solenoid;

further comprising a controller, operably coupled to said solenoid, for controlling activation of said on-off type valve and an engine sensor, operably coupled to said controller, for sensing a property of said engine, said controller powering the solenoid in response to a signal received from said engine sensor to thereby adjust the piston according to said signal; and further comprising a pair of turbocharger intake supplies and a control valve disposed upstream from turbocharger intake supplies, said control valve comprising a butterfly valve operably coupled to said piston for transferring linear movement of said piston into rotary movement of said-butterfly valve in order to selectively direct said exhaust flow to said pair of turbochargers;

whereby, when the hydraulic system is in use, said on-off type valve is operable to substantially open and close said metering port or hole to adjust pressure of said hydraulic fluid acting on a side of said piston thereby to control movement of said piston and, in turn, movement of said control valve.

8. The system of claim 7, wherein said on-off type hydraulic valve comprises a poppet type hydraulic valve.

9. The system of claim 8, wherein said poppet type hydraulic valve has an internal chamber and a slidably mounted pin to plug and unplug the metered hole, said metered hole being formed in a valve seat of said poppet valve, said valve seat being arranged between said inlet passage and said drain such that unplugging and plugging said metered hole opens and closes said internal chamber to control communication of said hydraulic fluid from said inlet passage to said drain via said internal chamber.

10. The system of claim 9, wherein said cylinder comprises a cylinder body and a longitudinal bore extending therethrough having a first section and a second section, wherein said piston is slidable in said second section of said longitudinal bore and wherein said poppet valve is engaged to said cylinder body such that at least part of the internal chamber is accommodated within said first section of said longitudinal bore to leave a space between said valve seat and said piston to define a control chamber communicating with said inlet passage, and wherein said inlet passage extends through a side wall of said cylinder in fluid communication with said control chamber of said cylinder, wherein said drain extends through said cylinder side wall in fluid communication with said internal chamber and wherein said metering hole intercommunicates said internal chamber and said control chamber to control communication of hydraulic fluid from the control chamber to the drain.

11. The system of claim 7, wherein said controller is adapted to vary the duty cycle of said solenoid to thereby control the position of said piston.

12. A method of adjusting a control valve for controlling exhaust flow in an engine, comprising:

providing a hydraulic actuator comprising a spring return piston disposed in a cylinder having an inlet passage and a drain; said cylinder comprising a cylinder body and a longitudinal bore extending therethrough having a first section and a second section, supplying hydraulic fluid to said cylinder;

operably coupling a poppet type hydraulic valve to said cylinder, said poppet hydraulic valve having an internal chamber and a slidably mounted pin to plug and unplug a metered hole formed in a valve seat of said poppet valve; said valve seat being arranged between said inlet passage and said drain such that communication of fluid from said inlet passage to said drain is controllable via said internal chamber by plugging and unplugging said metered hole, wherein operably coupling said poppet type hydraulic valve to said cylinder includes engaging said poppet type valve to said cylinder body such that at least part of the internal chamber is accommodated within said first section of said longitudinal bore to leave a space between said valve seat and said piston to define a control chamber communicating with said inlet passage, wherein said inlet passage extends through a side wall of said cylinder in fluid communication with said control chamber of said cylinder, wherein said drain extends through said cylinder side wall in fluid communication with said internal chamber and wherein said metering hole intercommunicates said internal chamber and said control chamber to control communication of hydraulic fluid from the control chamber to the drain;

powering said poppet type hydraulic valve in order to unplug and plug said metering hole to open and close said internal chamber and thereby control communication of hydraulic flow from said inlet passage to said drain via said internal chamber and adjust the pressure of hydraulic fluid acting on said piston;

transferring motion of said actuator, caused by a change in said hydraulic pressure, to said flow control valve; and adjusting the position of said flow control valve by controlling said poppet type hydraulic valve.

13. The method of claim 12, wherein said poppet type hydraulic valve is a solenoid operated poppet valve.

14. The method of claim 13, wherein powering said poppet valve comprises cycling said solenoid valve between an energized and a de-energized state.

15. The method of claim 14, wherein powering said poppet valve further comprises providing a pulse width modulated (PWM) signal to said solenoid and modifying the pulse width of said signal to thereby control the position of said piston.

* * * * *